United States Patent [19]
Pennock

[11] Patent Number: 4,886,318
[45] Date of Patent: Dec. 12, 1989

[54] ATTACHMENT FOR A SAFTY BELT HARNESS

[76] Inventor: Betty D. Pennock, Apartment 902, 12141 Jasper Avenue, Edmonton, Alberta, Canada, T5N 3X8

[21] Appl. No.: 270,738
[22] Filed: Nov. 14, 1988
[51] Int. Cl.⁴ .............................................. B60R 21/00
[52] U.S. Cl. ..................................... 297/482; 280/808
[58] Field of Search .............. 297/482, 467, 468, 453; 280/801, 806, 808

[56] References Cited

U.S. PATENT DOCUMENTS

| | | | |
|---|---|---|---|
| 3,895,841 | 7/1975 | Lebert | 297/453 X |
| 3,957,282 | 5/1976 | Finnigan | 297/482 |
| 4,012,072 | 3/1977 | Hansen | 297/453 X |
| 4,341,422 | 7/1982 | Cunningham | 297/488 |
| 4,342,483 | 3/1982 | Takada | 297/488 |
| 4,619,468 | 10/1986 | Spill | 297/488 X |
| 4,693,495 | 9/1987 | LaPointe | 297/482 X |

FOREIGN PATENT DOCUMENTS

| | | | |
|---|---|---|---|
| 3204121 | 8/1983 | Fed. Rep. of Germany | 297/482 |
| 1368324 | 6/1964 | France | 297/482 |
| 1581996 | 12/1980 | United Kingdom | 297/482 |

Primary Examiner—Peter R. Brown

[57] ABSTRACT

An attachment for a safety belt harness consisting of an elongate body having a top face and a bottom face. The bottom face has a clinging surface such that the body adheres to a wearer. The top face has a slippery surface thereby permitting a safety belt harness to move longitudinally on the top surface. A longitudinal channel is provided on the top face to confine the safety belt harness against transverse movement.

13 Claims, 2 Drawing Sheets

ATTACHMENT FOR A SAFTY BELT HARNESS

The present invention relates to an attachment for a safety belt harness.

BACKGROUND OF THE INVENTION

Automobile safety belt harnesses are presently made of webbed belts with metal fasteners. These webbed belts have peripheral edges which are abrasive. As the wearer moves the belt rubs against his or her body. During such periods of movement the peripheral edges may damage some types of clothing fabric or cause skin irritation if rubbed against sensitive skin. The metal fasteners, similarly, can damage clothing or cause discomfort. The problem is particularly acute with young children, as the children have sensitive skin and the harnesses designed for their use have additional belts. If the child experiences discomfort, he or she may throw a tantrum when the parent attempts to secure the safety harness or repeatedly release the fastener while the automobile is in motion, in an attempt to escape the harness.

To address this problem covering attachments have been developed which overlay a portion of the safety harness. The prior art relating to such attachments teaches that the attachments should be securely fastened to the belt to prevent the attachment from moving out of correct position upon impact. The problem with this teachings is that, although the attachment is substituted for belt, the rubbing action which is the source of the problem continues. The rubbing of the attachment against the wearer can cause damage to clothing or irritation to skin, although much less than would be caused by the belt without the attachment.

SUMMARY OF THE INVENTION

What is required is an attachment for a safety belt harness which permits free passage of the safety belt harness.

According to the invention there is provided an attachment for a safety belt harness which is comprised of an elongate body having a top face, a bottom face and longitudinal sides. The bottom face has a clinging surface such that the body adheres to a wearer. The top face has a slippery surface thereby permitting a safety belt harness to move longitudinally on the top surface. Means is provided to confine the safety belt harness against movement transverse to the top surface.

Although beneficial results may be obtained through use of the attachment for a safety belt harness described it is desirable to keep the construction of the attachment as simple as possible. Even more beneficial results may, therefore, be obtained if the elongate body is made of foam with a fabric sleeve having the clinging surface and the slippery surface.

The preferred means for confining the safety belt harness is a longitudinal channel, a cover flap or a combination of both.

Although beneficial results may be obtained through use of the attachment for a safety belt harness described it is desirable to keep the construction of the attachment as simple as possible. Even more beneficial results may therefore be obtained if the elongate foam body has longitudinal slits on the top face of the body adjacent the peripheral edges, such that the pressure of the safety belt harness on the foam body defines a longitudinal channel.

Although beneficial results may be obtained through use of the attachment for a safety belt harness as described, even more beneficial results may be obtained if the attachment were capable of being used with both adult and child safety harnesses. This may be accomplished by the addition of the preferred feature of having transverse openings in the cover flaps thereby permitting the attachment to be used with a safety belt harness having a plurality of belts.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
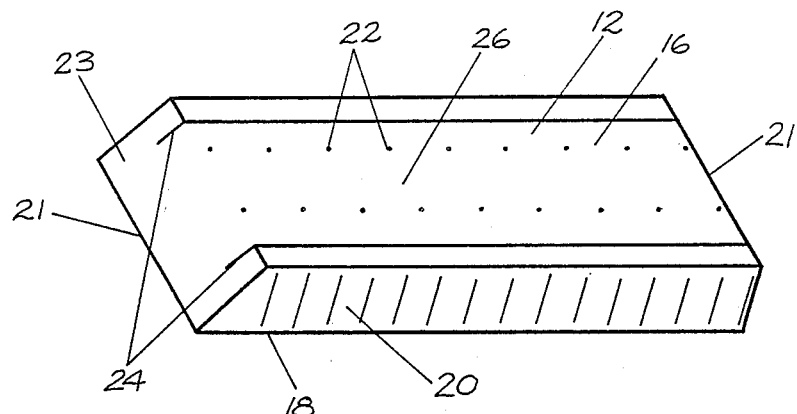
FIG. 2 is a perspective view of a first portion of the attachment for a safety belt harness illustrated in FIG. 1.
Figure 3:
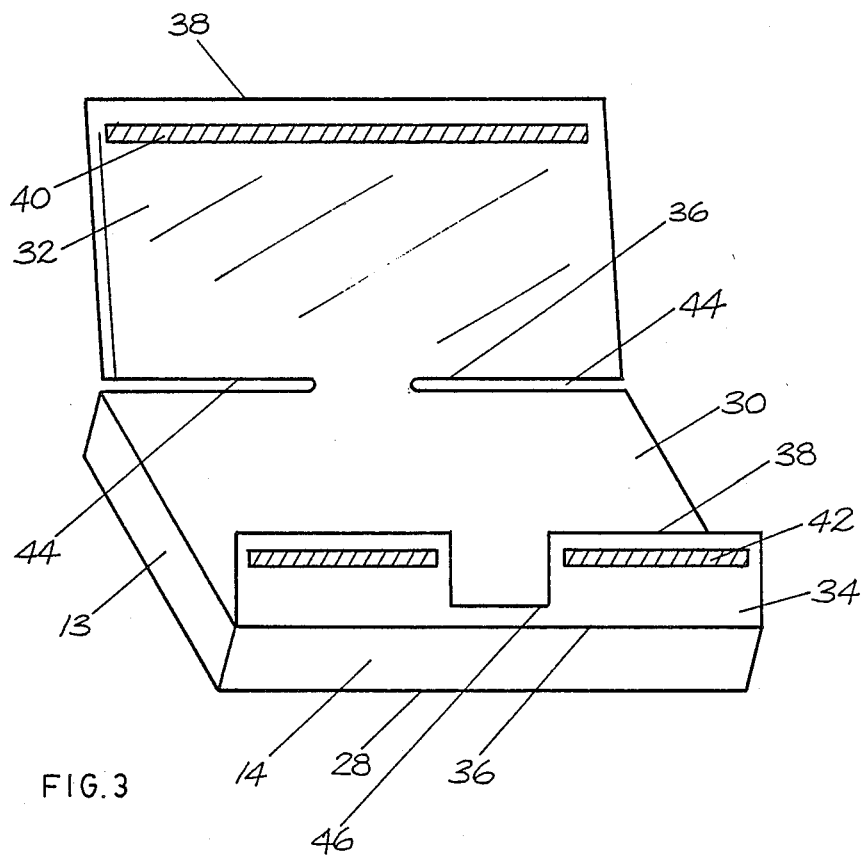
FIG. 3 is a perspective view of a second portion of the attachment for a safety belt harness illustrated in FIG. 1.

The preferred embodiment will now be described with reference to FIGS. 1 through 3. The preferred embodiment, generally designated by reference numeral 10, is an attachment for a safety belt harness.

Attachment 10 consists of two primary components an elongate foam body 12 and a fabric sleeve 14. Foam body 12 fit within an interior passage 13 of fabric sleeve 14. Foam body 12, as illustrated in FIG. 2, has a top face 16, a bottom face 18 and longitudinal sides 20 and transverse ends 21. One of transverse ends 21 have a slope 23 which extends from top face 16 toward bottom face 18. A plurality of perforations 22 extend from top face 16 through foam body 12 to bottom face 18. Top face 16 of foam body 12 has longitudinal slits 24 adjacent longitudinal sides 20. Longitudinal slits 24 define the boundaries of a channel 26, as will hereinafter be further explained. Fabric sleeve 14, as illustrated in FIG. 3, has a bottom face 28 and a top face 30. Two mating cover flaps 32 and 34 are secured to sleeve 14. Each of the cover flaps 32 and 34 have two opposed longitudinal edges 36 and 38. Longitudinal edges 36 of each of cover flaps 32 and 34 are secured on top face 30 of sleeve 14. Longitudinal edges 38 of each of cover flaps 32 and 34 have the tape fasteners 40 and 42, respectively. Flaps 32 and 34 have transverse openings 44 and 46, respectively.

The operation of attachment 10 will now be described with reference to FIGS. 1 through 3. Unlike other attachments for safety belts which firmly grip the safety belt, attachment 10 forms a passage to permit free movement of the safety belt. Bottom face 28 of sleeve 14 is made from a material having a clinging surface which secures attachment 10 to the person wearing the safety belt. The "clinging" properties of the fabric relate to the thickness of the nap. The Applicant has found that fabrics such as velvet, velour, or polyester and cotton cord are suitable for the intended purpose. The thickness of the nap provides a resisting force which maintains sleeve 14 in position. The Applicant has found that an exterior material of velvet and velour are pleasant to the touch and sight, in addition to providing the necessary cling surface to confine attachment 10 in place and eliminate friction on the wearer. Top face 30 of sleeve 14 is made from a material having a slippery surface which permits a safety belt harness to slide without much resistance. The sliding properties of the fabric, as with the clinging properties, relate to the nap of the material selected. The Applicant has found that fabrics such as polyester, taffeta, or satin are suitable for the intended purpose. The person wearing the safety belt places bottom face 28 of sleeve 14 in position adhering to their clothing near the shoulder. When the safety belt is buckled into position the safety belt will move longitudinally on top face 30 of sleeve 14. Foam body 12 is inserted into sleeve 14 to provide necessary padding. When the safety belt is positioned on top face 30 of sleeve 14 pressure exerted on foam body 12 by the safety belt tends to compress the foam. The presence of longitudinal slits 24 on top face 16 of foam body 12 results in the pressure exerted by the safety belt on foam body 12 defining a longitudinal channel 26. Longitudinal channel 26 serves to confine the safety belt while still permitting the belt unimpeded longitudinal movement. Longitudinal slits 24 also serve to allow sides 20 to encase the safety belt and buckle when pressure is applied. Attachment 10 should be oriented such that foam body 12 is oriented with slope 23 on one of transverse ends 21 pointing downward. In the absence of slope 23 pressure exerted by the safety belt on apparatus 10 can create a pressure point along transverse end 21 which may cause discomfort to the wearer. Slope 23 serves to diffuse the pressure exerted by the safety belt over the area of the slope, for the greater comfort of the wearer. This is a particular advantage for wearers who would be sensitive to such pressure, for example, women with large breasts. Flaps 32 and 34 are movable between a first position covering top face 28 of sleeve 14 and channel 26 and a second position removed from and giving access to channel 26. Flaps 32 and 34 serve to confine the safety belt to ensure it remains in contact with top face 28 of sleeve 14. Flap 32 may be detachably secured to flap 34 by bringing tape fastener 40 on edge 38 of flap 32 into engagement with mating tape fastener 42 on flap 34.

Figure 1:
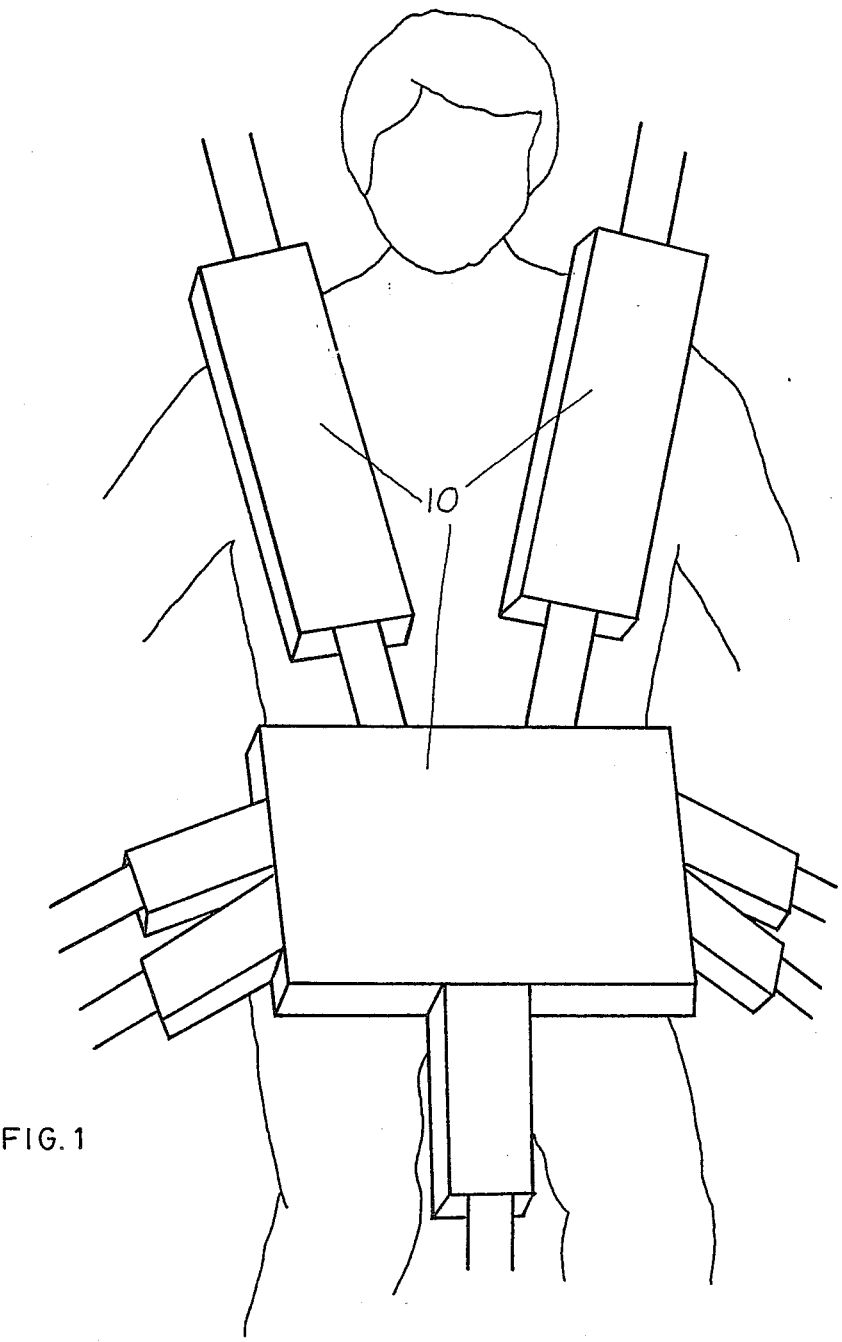
FIG. 1 is a perspective view of a preferred embodiment of the invention in association with a safety belt harness.

When attachment 10 is used with a safety belt restraint harness designed for children, as illustrated in FIG. 1, the belts intersect from a number of directions. To adapt attachment 10 for such use flaps 32 and 34 have transverse openings 44 and 46. Openings 44 permit a safety belt to pass over the shoulders of the infant and connect to a safety belt which extends substantially horizontally. Opening 46 permits a safety belt to pass between the legs of the infant and connect with a safety belt which extends substantially horizontally. The plurality of perforations 22 in foam body 12 permits the circulation of air which makes attachment 10 more comfortable as a cooler surface is next to the person wearing the safety belt. The materials used in the construction of the attachment, are washable in cold water and dryable on low cycle, to prevent from shrinkage, running of colors or fading of material when washed and dried.

It will be apparent to one skilled in the art that the combination of an exterior surface which grips the wearer and an interior surface providing a slip surface to enhance the movement of the safety belt decreases irritation to the person wearing the safety belt while giving complete freedom of movement. It will further be apparent to one skilled in the art that having longitudinal slits 24 in foam body 12 which form a channel 26 gives firmness and soft edges to attachment 10. It will further be apparent to one skilled in the art, that when adapted for use with a child's safety belt restraint harness, the invention aids in preventing children from releasing the buckle on their safety belts.

As many possible embodiments may be made of this invention concept, and as many varied modifications may be made in the embodiments herein before shown or described, it is to be understood that all matter herein is to be interpreted as illustrative and not in a limiting sense.

The embodiments of the invention in which an exclusive property or privilege is claimed are defined as follows:

1. An attachment for a safety belt harness, comprising:
    an elongate body having a top face, a bottom face and longitudinal sides, the bottom face having a clinging surface such that the body adheres to a wearer, the top face having a slippery surface thereby permitting a safety belt harness to move longitudinally on the top surface, a longitudinal channel being provided to confine the safety belt harness against movement transverse to the top surface, the elongate body being made of foam with longitudinal slits on the top face of the body adjacent the sides, such that the pressure of the safety belt harness on the foam body defines the longitudinal channel and maintains the safety belt harness in contact with the elongate body.

2. An attachment for a safety belt harness as defined in claim 1, having at least one cover flap with opposed longitudinal edges, the cover flap being movable between a first position covering the top face of the body and a second position removed from and giving access to the top face, one longitudinal edge of the cover flap being secured to the body, and the opposed longitudinal edge of the cover flap having means to detachably secure the cover flap to the body.

3. An attachment for a safety belt harness as defined in claim 2, having two mating cover flaps each of the cover flaps being secured on the top face of the body adjacent one of the sides.

4. An attachment for a safety belt harness as defined in claim 3, having transverse openings in the cover flaps thereby permitting the attachment to be used with a safety belt harness having a plurality of belts.

5. An attachment for a safety belt harness as defined in claim 2, the means to detachably secure the cover flap to the body being a tape fastener which is detachably secured to a mating tape fastener on the body.

6. An attachment for a safety belt harness as defined in claim 1, the foam body having a plurality of perforations thereby permitting the circulation of air through the body.

7. An attachment for a safety belt harness as defined in claim 1, the elongate body being made of foam with a fabric sleeve having the clinging surface and the slippery surface.

8. An attachment for a safety belt harness, comprising:
    a. an elongate foam body having a top face, a bottom face and longitudinal sides, the elongate body having longitudinal slits on the top face adjacent the sides, such that the pressure of a safety belt harness on the foam body defines a longitudinal channel, the elongate foam body having a fabric sleeve, the bottom face of the sleeve covered body having a clinging surface such that the body adheres to a wearer, the top face of the sleeve covered body having a slippery surface thereby permitting a safety belt harness to move longitudinally in the channel; and b. two mating cover flaps movable between a first position covering the channel on the top face of the body and a second position removed from and giving access to the channel, each of the cover flaps having two opposed longitudinal edges, one of the longitudinal edges of each cover flap being secured on the top face of the body adjacent one of the sides and the opposed longitudinal edges of each of the cover flaps having means to detachably secure the opposed edges of the cover flaps.

9. An attachment for a safety belt harness as defined in claim 8, the means to detachably secure the opposed edges of the cover flaps being mating tape fasteners.

10. An attachment for a safety belt harness as defined in claim 8, having transverse openings in the cover flaps thereby permitting the attachment to be used with a safety belt harness having a plurality of belts.

11. An attachment for a safety belt harness as defined in claim 8, the foam body having a plurality of perforations thereby permitting the circulation of air through the body.

12. An attachment for a safety belt harness, comprising:

a. an elongate foam body having a top face, a bottom face and longitudinal sides, the elongate foam body having a plurality of perforations thereby permitting the circulation of air through the body, the elongate foam body having longitudinal slits on the top face adjacent the sides, such that the pressure of a safety belt harness on the foam body defines a longitudinal channel, the elongate foam body having a fabric sleeve, the bottom face of the sleeve covered body having a clinging surface such that the body adheres to a wearer, the top face of the sleeve covered body having a slippery surface thereby permitting a safety belt harness to move longitudinally in the channel;

b. two mating cover flaps movable between a first position covering the channel on the top face of the body and a second position removed from and giving access to the channel, each of the cover flaps having two opposed longitudinal sides, one of the longitudinal edges of each cover flap being secured on the top face of the body adjacent one of the sides and the opposed longitudinal edges of each of the cover flaps having a tape fastener to detachably secure the opposed edge of the cover flaps to a mating tape fastener on the other cover flap; and c. transverse openings in the cover flaps thereby permitting the attachment to be used with a safety belt harness having a plurality of belts.

13. An attachment for a safety belt harness, comprising:

an elongate body having a top face, a bottom face and longitudinal sides, the bottom face having a clinging surface such that the body adheres to a wearer, the top face having a slippery surface thereby permitting a safety belt harness to move longitudinally on the top surface, a longitudinal channel being provided to confine the safety belt harness against movement transverse to the top surface, the longitudinal channel consisting of two mating cover flaps with opposed longitudinal edges, the cover flaps being movable between a first position covering the top face of the body thereby defining the longitudinal channel and maintaining the safety belt harness in contact with the elongate body and a second position removed from and giving access to the top face, one longitudinal edge of each cover flap being secured to the top face adjacent one of the sides of the body, and the opposed longitudinal edge of each of cover flap having means to detachably secure the cover flaps to the body, the cover flaps having transverse openings thereby permitting the attachment to be used with a safety belt harness having a plurality of belts.

* * * * *